United States Patent [19]

Lauriente et al.

[11] 3,791,853

[45] Feb. 12, 1974

[54] THERMAL COATED BOOMS FOR SPACECRAFT

[75] Inventors: Michael Lauriente, Clarksville; Ernst R. Pemsel, Jr., Ellicott City, both of Md.

[73] Assignee: Westinghouse Electric Corporation, Pittsburgh, Pa.

[22] Filed: July 28, 1971

[21] Appl. No.: 166,965

Related U.S. Application Data

[62] Division of Ser. No. 742,191, July 3, 1968, Pat. No. 3,622,400.

[52] U.S. Cl.............. 117/97, 138/156, 148/6.14, 148/6.31, 148/31.5
[51] Int. Cl............................................. B64g 1/00
[58] Field of Search ...... 52/108; 138/156; 148/6.14, 148/6.31, 13, 31.5; 117/95, 94, 97

[56] References Cited
UNITED STATES PATENTS

| | | | |
|---|---|---|---|
| 3,622,400 | 11/1971 | Lauriente et al. | 148/6.14 |
| 3,144,104 | 8/1964 | Weir et al. | 52/108 |
| 3,174,537 | 3/1965 | Meyer | 117/33.3 X |
| 3,177,987 | 4/1965 | Swaim | 52/108 |
| 3,198,672 | 8/1965 | DeHart | 148/6.14 |
| 3,361,377 | 1/1968 | Trexler, Jr. | 52/108 |
| 3,428,473 | 2/1969 | Langley | 117/35 |
| 3,357,457 | 12/1967 | Myer | 52/108 X |

Primary Examiner—Ralph S. Kendall
Attorney, Agent, or Firm—R. T. Randig

[57] ABSTRACT

A spacecraft boom having improved resistance to thermally induced bending forces resulting from solar radiation is disclosed, comprising a beryllium containing copper base alloy having a highly absorbent coating disposed on the interior and a highly reflective coating on the exterior. A process is disclosed for manufacturing such booms including a coating, milling, forming and heat treating to obtain the finished product.

8 Claims, No Drawings

THERMAL COATED BOOMS FOR SPACECRAFT

CROSS-REFERENCE TO RELATED APPLICATION

The present application is a division of application Ser. No. 742,191 filed July 3, 1968, now U.S. Pat. No. 3,622,400 and is closely related to application Ser. No. 684,241, filed Nov. 20, 1967, now U.S. Pat. No. 3,543,806 in the name of Rushing et al. entitled "Extendible Boom".

The invention described herein was made in the performance of work under a NASA contract and is subject to the provisions of Section 305 of the National Aeronautics and Space Act of 1958 Public Law 85–568 (72 Stat. 435; 42 U.S.C. 2457).

BACKGROUND OF THE INVENTION

1. Field of the Invention

The present invention relates to spacecraft booms which are characterized by having a high resistance to thermally induced bending forces resulting from solar radiation.

2. Description of Prior Art

It is highly desirable for space vehicles to be provided with extendible type booms which are formed from a strip of thin resilient metal so that when deployed from a storage drum it forms a cylindrical shape with the edges interlocked similar to a zipper. This general configuration is more fully set forth in U.S. Pat. No. 3,177,987 to Swain and U.S. Pat. No. 3,144,104 to Weir et al. However, one of the difficulties which has been encountered relates to the fact that solar radiation is sufficient to cause unequal stresses and thereby induce thermal bending in the booms when they have been extended. An initial solution to this problem was attempted in providing a base member having a very high degree of thermal conductivity. This was later further modified by the selective provision for windows within the boom itself so that differences in the thermal levels between the interior and exterior surface was minimized. However, none of these solutions to the problem appeared to solve the difficulties encountered with differential absorption and reflection of radiation between the different sides of a boom, and consequently undesirable thermally induced bending stresses still occured in the extended boom. It was believed that the application of coatings for the purpose of optimizing the differential absorptivity-reflectivity would solve the problem so that the boom would always have a uniform temperature in space, that is, the temperature of different portions of the inside and outside walls of the boom would be essentially the same. However, the solutions attempted for reduction of the boom bending problem were ineffective and, at best, were only temporary in nature because of various technological difficulties, foremost among these being the provision of a stable coating having the required degree of reflectivity or absorptivity in the environment of the intended usage.

SUMMARY OF THE INVENTION

In order to overcome the foregoing difficulties, the novel boom of the present invention has been produced. The boom of the present invention employs a strip of copper base alloy containing between about 1.8 percent and about 2.05 percent beryllium, about 0.2 percent to about 0.3 percent cobalt and the balance substantially copper with incidental impurities. The starting copper base alloy strip material is supplied in the solution treated, unaged but half hard temper condition preferably with a highly polished surface. This material is then subjected to vapor phase degreasing following which one surface of the strip material is provided with a black copper oxide coating, without the benefit of any sort of intermediate metallic plating. Following the application of the black copper oxide coating, or more accurately the development thereof, the strip material is washed and thereafter subjected to milling by an etching process to provide a plurality of windows in a predetermined pattern along the entire length of the strip material. Following such milling, the opposite surface from that containing the black cooper oxide is provided with a highly thermally reflective coating which is disposed to cover the entire uncoated surface of the boom material. Preferably the thermally reflective material consists of specular aluminum and said aluminum may also be provided with a relatively transparent coating of $SiO_2$. Preformed tabs are thereafter produced along the length of each longitudinal edge of the strip, the tabs capable of interlocking when shaped into a tubular boom configuration, following which the material is subjected to a memory aging heat treatment in a protective atmosphere, said aging heat treatment being conducted at a temperature within the range between about 500°F. and about 700°F. on the tubular configuration until a "memory" is induced to the copper beryllium alloy strip. As a result, the aged strip can be rolled flat, but will readily assume tubular configuration. As thus formed, the boom of the present invention provides an outstanding degree of thermal stability and resistance to anisotropic radiation in space as manisfested by minimizing the degree of bending induced to the strip when the same is extended in the form of a boom.

It is an object of the present invention to provide an extendable boom for spacecraft which is characterized by improved resistance to thermally induced bending forces resulting from solar radiation.

It is another object of the present invention to provide a process for forming coatings on the surface of a beryllium containing copper base alloy which are useful for providing a high degree of absorption and reflectivity when the copper base alloy is assembled in the form of a boom for spacecraft.

A more specific object of the present invention is to provide a spacecraft boom and a process for manufacturing the same whereby improved resistance to thermally induced bending forces resulting from solar radiation is obtained through the application of a coating to the interior surface of the boom, which coating consists of a black copper oxide coating formed without any intermediate plating and a coating on the exterior surface which has a high degree of reflectivity therby minimizing any thermal gradients between the interior and exterior surface of the walls of the spacecraft boom.

These and other objects of this invention will become apparent when taken in conjunction with the following description.

DESCRIPTION OF PREFERRED EMBODIMENT

The basic material from which the boom of the present invention is preferably composed consists of a specific copper base alloy. This material is selected since it has a high degree of thermal conductivity and is heat treatable to the desired high strength levels. More particularly, the copper base alloy comprises from about 1.8 percent to about 2.05 percent beryllium, about 0.2 percent to about 0.3 percent cobalt and the balance essentially copper with incidental impurities. Such an alloy has been identified as a standard material by the Copper Development Association and is designated CDA No. 172. The material can be produced in or is obtained in the solution treated, unaged but half-hard temper condition, the temper resulting from cold rolling after the solution heat treatment. Preferably the copper base alloy strip has a thickness typically of about 0.002 inch and a predetermined width of about 2 inches for an interlock or zippered diameter of nominally ½ inch. The strength and diameter of the boom predicate the thickness and width of material to be used. Consequently where large diameter booms are required, the width of the strip will be increased as well as the thickness, depending upon the ultimate requirements.

It is imperative that the copper base beryllium alloy strip have a surface which is smooth and highly polished. In practice a surface finish of 2.0 microinch A.A. or less is preferred but in no case can it exceed 3.0 microinch A.A. The quality of the surface influences the final reflectivity, as will be set forth more fully hereinafter, and the adherence of the reflective coating. Moreover, difficulties may be encountered in the uniformity of the copper oxide coating or the milling of the boom windows unless such surface smoothness be present. The fact that the strip surface is smooth and polished, aids in providing the surface with a clean condition prior to developing the black absorbtive surface. The cleaning step is performed by exposing the surface of the strip to the vapor phase of an organic degreaser. Particular success has been had employing trichloroethylene as the typical vaporizable solvent and exposing a strand of the strip thereto. The speed of the strip material in the degreaser is adjusted to accommodate the condensation requirements of the equipment. After this degreasing step the strip material is substantially free of any contaminants which may interfere with the process of the present invention.

Since only one surface of the finished boom, namely the interior surface, is to be provided with the absorbtive coating, a stop-off lacquer is applied to the opposite side in a preliminary step. For simplicity this is done in practice by passing the strip material over a reservoir of a lacquer in such a fashion that only one side of the strip material is coated. This is accomplished by controlling the level of lacquer and passing the strip material tangentially to said surface. The apparatus performing this function is referred to as a "kiss coater". Any high resin solids air-drying lacquer, preferably without any pigment, which can be brushed, sprayed or dipped may be employed. A lacquer sold under the trademark MICROSHIELD supplied by Michigan Chrome and Chemical Company has been suited to the process of the present invention. While one coat of lacquer will usually suffice, two coats of lacquer are preferred, in order to provide for utmost reliability, the first coat serving as a primer coat. During the lacquer application viscosity is preferably adjusted to obtain a reading of 31 to 33 seconds using a number one Zahn cup measured at 70°F ± 5°. The speed of the strip through the lacquer applying reservoir is controlled within the limits of about 15 to about 18 inches of strip travel per minute. The coating is dried or cured nominally at a temperature of 120°F.

With the ultimate exterior surface of the boom strip thus protected by the lacquer coating, the other side of the strip material is then subjected to a pickling and activation solution prior to blackening. In particular, the vapor solvent degreased and lacquered beryllium copper strip is passed through a pickling activation solution which consists essentially of a mineral or oxidizing acid such as nitric or sulfuric acid, to which certain additives may be added. Any one of a number of compositions can be employed. Thus a solution of 10 percent concentrated nitric acid, 20 percent water and 70 percent of 85percent $H_3PO_4$ is suitable; a solution of sulfuric and nitric acid in proportions of equal volumes is usable; and dilute (5 percent) sulfuric acid with 5 percent chromic acid or 3 percent sodium dichromate is also suitable. In practice it has been found that certain proprietary activators perform quite satisfactorily. Examples thereof are Actane 97A, Actane 97B and Actane 70 each of which is manufactured by the Enthone Corporation. The pickling activator bath is maintained at room temperature and the strip material is in this solution for approximately a period of 2 to 3 minutes. After the activator solution has reacted with and brightened the surface of the beryllium copper strip, the strip material is passed through a cold water rinse.

As activated, the strip is next passed through the blackening solution. While any suitable blackening solution will suffice such as sulfides or polysulfides, with or without an applied electrical potential, it is preferred to develop the black surface employing an alkali-slat to which a strong oxidizing agent may be added. Such blackening compositions comprise from 5 to 1,000 grams per liter of an alkali (NaOH or KOH) and from 10 grams to saturated solution of an alkali chlorate. Thus a solution of 150 grams per liter of NaOH and 150 grams per liter of sodium chlorate will give excellent results. The surface so produced is preferably a black copper oxide. Particular success has been achieved by employing one of the commercial blackening solutions which are manufactured by the Enthone Corporation and marketed under the name Ebonel "C". Two to three pounds of the mixture of alkali and alkali chlorate is mixed with water to make one gallon of solution and the temperature of the solution is maintained preferably within the range of between about 210°F. and 220°F. While the strip material is maintained in the solution it is agitated continuously the same as when subjected to the activation step. The blackening solution is kept at a predetermined specific gravity within the range between about 1.27 and 1.45 which is measured at 70°F. ± 5°. Following the blackening treatment the strip material is given a water spray rinse and dried. The blackening process leaves a velvet finish of a loose oxide which is required to be removed. This is accomplished by buffing to a uniform black appearance.

Following the application of the black coating to the one surface of the strip, the lacquer mask is dissolved by the use of an organic solvent to prepare the strip for the milling or holes therein.

While any suitable method may be employed for forming said windows, it has been found desirable to employ the process known as "chemical milling". This process has produced outstanding results. The chemical milling step is accomplished by coating both sides of the strip with a solution of a positive photoresist. Thereafter, the side of the tape opposite the black oxide coating is exposed to ultraviolet light through a negative with the prescribed hole or window pattern following which the latent image is developed in a manner well known and the unexposed portions of the photoresist are washed off. The strip with the photoresist pattern is then subjected to an acid etchant (ferric chloride) until the window results with a water rinse and air drying following. Thereafter the photomask resist is stripped in an organic solvent in a manner well known in the art, following which the strip is cleaned in the vapor phase of a degreaser employing, for example, trichloroethylene as the cleaning step in the preparation for the next step.

As stated previously, the boom of the present invention is provided with a highly reflective surface on the exterior thereof. This reflective surface preferably comprises a coating of aluminum nominally about 1,500 angstroms units in thickness which may be protected by a transparent $SiO_2$ or silicon monoxide coating of approximately the same thickness. Success has been had by utilizing a rotating drum technique wherein the strip is wound on a drum which is thereafter rotated over a metallizing source in a highly evacuated chamber comprising a crucible of aluminum heated to a high temperature. Glow discharge can be employed to clean the strip on the drum prior to metallization and the aluminum deposition may be immediately followed by the $SiO_2$ without any interruption to the cycle. Where desired, the $SiO_2$ coating may be omitted and the aluminum coating thickness increased up to 5,000A. As an acceptable alternative to the foregoing method of coating the copper base alloy strip with aluminum, the process may be carried out in a chamber under a high vacuum wherein an electron gun deposition technique is used. In this particular technique one electron beam gun is focused on the strip for initially degassing and cleaning the same and the second electron beam gun has its electron beam focused into a crucible filled with molten aluminum. The aluminum vapor from the crucible condenses on the moving strip.

It has been found, however, that in order to obtain the combination of high reflectivity and good adhesion of the aluminum, several conditions are necessary. These are, generally speaking for reflectivity a low angle of incident vaporization, that is, the angle of incident evaporation approaches that of normal incidence. In addition thereto a low substrate temperature must be maintained and there must be a limited thickness for the aluminum deposit. In practice it has been found that it is desirable to keep the temperature of the substrate below about 420°F, preferably at a temperature not in excess of 370°F. If the substrate is heated to temperatures in excess of about 420°F premature aging occurs. The thickness of the aluminum deposit should be limited to about 5,000 angstrom units in thickness. If this thickness is exceeded, burnishing will usually restore the reflectivity. The base pressure of the system preferably should be kept less than $3 \times 10^{-4}$ torr in order to avoid a blue cast to the aluminum surface which will occur when these conditions are not met. In addition thereto, it has been found that the techniques described hereinbefore for cleaning the strip are critical for the adhesion.

The aluminum coated strip is thereafter subjected to a preforming operation in which the longitudinal edges of the strip material are cut or punched into tabs in an alternately left and right side sequence. These tabs, as formed at predetermined intervals along each longitudinal edge of the strip, are separated by a substantially V-shaped notch so that the opposite strip edges when brought into overlapping positions may maintain an interlocking engagement therebetween in order to set the strip into its cylindrical configuration. This particular operation sequence is more clearly set forth in application Ser. No. 684,241 referred to hereinbefore.

Following the formation of the opposed tabs and the preforming of said tabs, the strip material is thereafter subjected to a heat treatment by pulling the same through a tube type furnace with a boom extractor employing a given tension on the strip material. The furnace tube is of predetermined dimensions for each required diameter boom so that the proper memory can be instilled into the heat treated material forming the boom. Preferably the heat treatment takes place at a temperature within the range of between about 500°F. and about 700°F. for a time period of up to 60 minutes at 500°F. such heat treatment being effected in a protective atmosphere such as for example, an argon atmosphere. The time at temperature can be reduced at the higher temperature. In particular, the strip material is pulled through the furnace with the boom extractor and during the pulling, the strip material is formed onto itself with the overlapping tabs so that said heat treatment imparts a memory thereto causing the strip to continue to close, in substantially cylindrical form. This memory which is applied to the now fully aged strip enables the strip material to be thereafter taken up and stored in a flat condition on a reel or drum. Thereafter when the cylindrical boom configuration is needed the strip can be extended in a linear manner and, through the proper manipulation, the boom automatically attains its cylindrical form and is locked or closed along its edges after the fashion of a zipper. The above-described process is effective for producing strip material capable of forming a cylindrical boom of over 200 feet long which exhibits a very high degree of thermal stability resulting from solar radiation. That is, when the booms are extended to their nominal length of 200 feet or more, very little bending is encountered because of the equalization of the thermal forces which are induced through solar radiation. In this respect is is noted that the whole configuration permits the solar radiation to enter through the windows onto the interior surface of the boom, which is provided with the black copper oxide coating having a 90 percent absorption. Since the material from which the boom is manufactured consists of a copper base alloy substrate which also contains an aluminum reflective coating which has 90 percent or more reflectivity, and by reason of the high conductivity of the copper base materials, it has been found that thermal gradients are minimized thereby reducing the bending tendency of the boom in operation in space while it is subject to solar radiation.

In order to more clearly demonstrate the process of the present invention as well as the product produced thereby, reference may be had to the following which details the construction of a coated boom for use in spacecraft. A coil of beryllium copper having from 1.8 percent to 2.05 beryllium and about 0.25 percent cobalt, identified as No. 25 alloy strip (CDA alloy No.

172). The strip has a width of 2 ± 0.001 inches and a thickness of 0.002 inch, was characterized by having been solution treated and cold rolled to the half hard condition and had an 0.2 percent offset yield strength of between 75 and 90 ksi. The surface of the strip material was clean and free of oxides, marks and scratches and had a surface finish of less than 2.0 A.A. The material was first subjected to the vapor phase degreasing in trichloroethylene. The speed of the strip material was four feet/minute. Both surfaces of the strip were scrubbed employing nylon brushes.

In preparing for the development of the black oxide coating a stop-off lacquer was applied to one side of the strip by means of a "kiss-coater". The lacquer known as MICROSHIELD, supplied by the Michigan Chrome and Chemical Company was applied in two coats, the first coat serving as a primer and for reliability a second coat was placed on the dired first coat. The strip material was fed into the "kiss coater" so that the surface to be coated just contacted the surface of the lacquer and the level of the lacquer was adjusted to give the strip material maximum immersion without causing flowing on the side not intending to be coated. The viscosity of the lacquer coating material was adjusted to obtain a reading of 31 to 33 seconds using a number one Zahn cup measured at 70°F. ± 5°. The speed through the lacquer was controlled within the limits of 15 to 18 inches per minute and each coat was fully dried at 120°F.

The unprotected side of the beryllium copper strip material was then subjected to the formation of a black copper oxide thereon. This was accomplished by passing the strip material through a pickling activation solution prior to blackening. The formulation of the solution included hydrochloric acid into which certain proprietary activators manufactured by the Enthone Corporation under the name Actane were added. More specifically, the preferred solution contained 9 ounces of Actane 97B, 12 ounces of Actane 97A, 3 ounces of Actane 70 and sufficient water to make 1 gallon of solution. The solution was maintained at ambient temperature and the strip was passed therethrough in such a manner that each segment of strip was immersed for a total time period of between 2 and 3 minutes and thereafter the strip rinsed in cold water.

The strip having the activated surface was then directed into the blackening solution for the development of the black copper oxide coating thereon. The oxide coating is developed by the application of a solution containing a caustic alkali, sodium hydroxide, to which has been added strong oxidizing agents. Such a solution is manufactured by Enthone Corporation under the name Ebonol "C". The solution is prepared by adding 2 to 3 lbs. of Ebonol "C" per gallon of water and mechanically agitating the solution. The temperature of the bath was adjusted to a temperature within the range between 210°and 220°F. The solution was agitated continuously and each segment of the strip material was subjected to the blackening solution for a time period between 2 to 3 minutes. During this period the Ebonol "C" solution was kept at a specific gravity of 1.27 to 1.45. Following treatment for developing the oxide the strip material was removed, subject to a water rinse for a time period of 2 to 3 minutes and a spray rate of 16 gallons per minute. Midway through the rinse, the strip surface was neutralized by the addition of a weak acid to the water. Thereafter the strip was dried. Since the blackening process left a velvet finish of a loose oxide, the surface of the strip was buffed to a uniform black appearance.

Following development of the black oxide coating, the lacquer mask coating was dissolved by applying acetone. While alkalized lacquer stripping solutions are also feasible they must be removed completely in order to have the surface receptive to the aluminum coating. The chemical milling of the windows through the strip material was accomplished by passing the strip through a solution of positive photoresist at a speed of 15 to 18 inches per minute. Heaters were placed on both sides of the coated strip so that the photoresist could be cured at a temperature of 120°F. Following curing of the photoresist the side of the tape opposite the black oxide coating was exposed to ultraviolet light through a transparent negative with a prescribed hole pattern. This hole pattern was provided by an alternating spiral configuration around the finish thickness, such spiral being clockwise in one direction and counterclockwise in the other and the points of intersection being the points at which the hole pattern for the windows of the boom were eventually to be milled. The holes cannot exceed about 15 percent of surface area of strip, preferably 10 percent to 15 percent. The latent image was developed, and all of the unexposed photoresist was washed off by a water rinse and the photoresist remaining was finally dried with a blast of air. Thereafter the masked strip material was passed through ferric chloride at 42° Baume at a temperature of 105°F. until the strip at the exposed portion was dissolved away. A water rinse and air dry followed. Thereafter the photomask was stripped in acetone.

The cleaned strip was then wound between two reels in a vacuum unit comprising a pay-off reel on one side and a take-up reel on the other side within the vacuum unit. Housed within the vacuum unit were two electron beam guns, one gun having its high energy electrons focused onto the strip for degassing cleaning purposes and the second gun had its electrons focused into a crucible filled with molten aluminum above which the clean strip passed. The vapor from the aluminum condensed upon the moving strip which was also preheated to a temperature of about 370°F. during the cleaning and degassing operation. During preheating 6KV at 0.3 amp was utilized and for the actual application of the aluminum coating to the strip 10KV at 0.8 amps were employed. The speed of the strip was regulated at a rate of 15 feet per minute. With thermal shields and baffle plates an aperture of 3 × 3 inches was employed with the preheat gun at a distance of 10 from the strip and the distance from the aluminum crucible to the strip was 17 inches. The temperature of the substrate was kept below 370°F. The strip speed was nominally 15 feet/minute once thermal equilibrium was indicated by the stability of the gun. The aluminum coating thus produced had a nominal thickness of about 4,000 angstrom units and the vacuum condition was maintained at 3 × 10$^{-4}$ torr during the entire operation. The strip emerged with a bright reflecting aluminum coating to the surface thereof.

The coated strip was thereafter fed into a tab bending machine which alternately bent the tabs in a left and right sequence in order to zipper the boom when the same is extended for operation.

Thereafter the strip material was heat formed by pulling it through a tube furnace with a boom extractor. A constant tension on the tape by the extractor started the tape into a cylindrical shape and zippered it simultaneously. The heat treatment which was applied to instill the requisite memory included a temperature setting to the furnace of 700°F. and employing a flow of argon at a rate of 5 liters/minute as the protective atmosphere. The strip was at temperature for a time period of about 8 minutes. Following its emergence from the heat treating furnace the strip material was taken up and stored in the flat condition on a drum for later use in spacecraft operation.

It will be appreciated that the process of the present invention can be employed utilizing different process variables. For example, other means may be employed for supplying the boom with the windows other than by the method of chemical milling as set forth hereinbefore for example, laser piercing. It is noted however that the process as outlined hereinbefore is effective for producing a black copper oxide on very thin subsrrate material. Heretofore, the recommended practice has been to copper plate at least a thickness of 0.002 inches before blackening. Thus, in the example given hereinbefore it would have required double the starting thickness of the material before the black oxide coating could be applied thereto. In addition thereto, by employing aluminum as the reflective surface on the exterior of the boom such problems as tarnishing are eliminated where another material is employed for example silver.

While there has been described only certain constructions and processes within the present invention, it will of course be understood that various modifications and alternative constructions may be made without departing from the spirit and scope thereof. It is therefore intended by the appended claims to cover all such modifications and alternate constructions as fall within the true spirit and scope thereof.

We claim as our invention:

1. A spacecraft boom having improved resistance to thermally induced bending resulting from solar radiation, comprising a thin, flat copper base alloy having a composition including between about 1.80 percent and about 2.05 percent beryllium, between about 0.2 percent and about 0.3 percent cobalt and the balance substantially copper with incidental impurities, disposed in retractable cylindrical relationship in the form of a spacecarft boom, a plurality of windows disposed in spaced relation along the length of the boom, a thermal reflective coating disposed on the exterior surface of the boom and a black oxide thermally absorptive material disposed on the interior surface of the boom, said thermally absorptive material being developed on the surface of the boom in the absence of a separate layer of copper plating.

2. The article of claim 1 in which the thermally reflective coating is nominally 90 percent reflective.

3. The article of claim 1 in which the thermally reflective coating comprises aluminum.

4. The article of claim 3 in which the aluminum coating is within the range of between 1,000 and 5,000 angstroms in thickness.

5. The article in claim 3 in which the aluminum coating is protected by a coating of $SiO_2$.

6. The article of claim 5 in which the $SiO_2$ coating has a thickness within the range between 1,000 and 5,000 angstrom units.

7. The article of claim 1 in which the copper base alloy has a highly polished surface not exceeding 2.0 microinches Arithmetic Average.

8. The article of claim 1 in which the black oxide surface is copper oxide and is nominally 90 percent thermally absorptive.

* * * * *